US010337950B2

(12) United States Patent
Cader et al.

(10) Patent No.: US 10,337,950 B2
(45) Date of Patent: Jul. 2, 2019

(54) COOLANT LEAK DETECTION BASED ON A NANOSENSOR RESISTANCE MEASUREMENT

(71) Applicant: Hewlett Packard Enterprise Development LP, Houston, TX (US)

(72) Inventors: Tahir Cader, Spokane, WA (US); Zhiyong Li, Palo Alto, CA (US); John Franz, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 113 days.

(21) Appl. No.: 15/397,798

(22) Filed: Jan. 4, 2017

(65) Prior Publication Data

US 2018/0188133 A1 Jul. 5, 2018

(51) Int. Cl.
*G01M 3/16* (2006.01)
*G01M 3/40* (2006.01)
(52) U.S. Cl.
CPC ..................... *G01M 3/40* (2013.01)
(58) Field of Classification Search
CPC ............ G01M 3/00; G01M 3/04; G01M 3/16; G01M 3/40
See application file for complete search history.

(56) References Cited

U.S. PATENT DOCUMENTS

| 2004/0160741 | A1 | 8/2004 | Moss et al. |
| 2008/0168826 | A1 | 7/2008 | Saidi et al. |
| 2011/0083492 | A1 | 4/2011 | Chang |
| 2013/0041601 | A1 | 2/2013 | Dintakurti et al. |
| 2013/0092547 | A1* | 4/2013 | Li ........................ C25D 13/04 205/122 |
| 2013/0205822 | A1* | 8/2013 | Heiland ............... H05K 7/2079 62/259.2 |
| 2014/0209272 | A1 | 7/2014 | Stocker et al. |
| 2014/0238107 | A1* | 8/2014 | Chou ....................... G01N 1/26 73/23.36 |
| 2015/0136265 | A1 | 5/2015 | Zulfiquar |
| 2017/0176330 | A1* | 6/2017 | Lahti ...................... H04R 1/028 |

OTHER PUBLICATIONS

Mujawar, T. H., et al. "A Wireless Sensor Network: A Dynamic System for Gas Leakage Detection", International Journal of Computer Applications (0975-8887), IJCA, 2014, 4 pages.
International Search Report and Written Opinion received for PCT Patent Application No. PCT/US2018/012352, dated Apr. 24, 2018, 14 pages.

* cited by examiner

*Primary Examiner* — Nguyen Q. Ha
(74) *Attorney, Agent, or Firm* — Hewlett Packard Enterprise Patent Department

(57) ABSTRACT

Examples herein relate to detecting a coolant leak. For example, a system includes a nanosensor coupled to an airflow channel in a server. The nanosensor provides a resistance measurement to a controller. The system includes the controller coupled to the nanosensor. The controller detects the coolant leak based on the resistance measurement from the nanosensor.

21 Claims, 6 Drawing Sheets

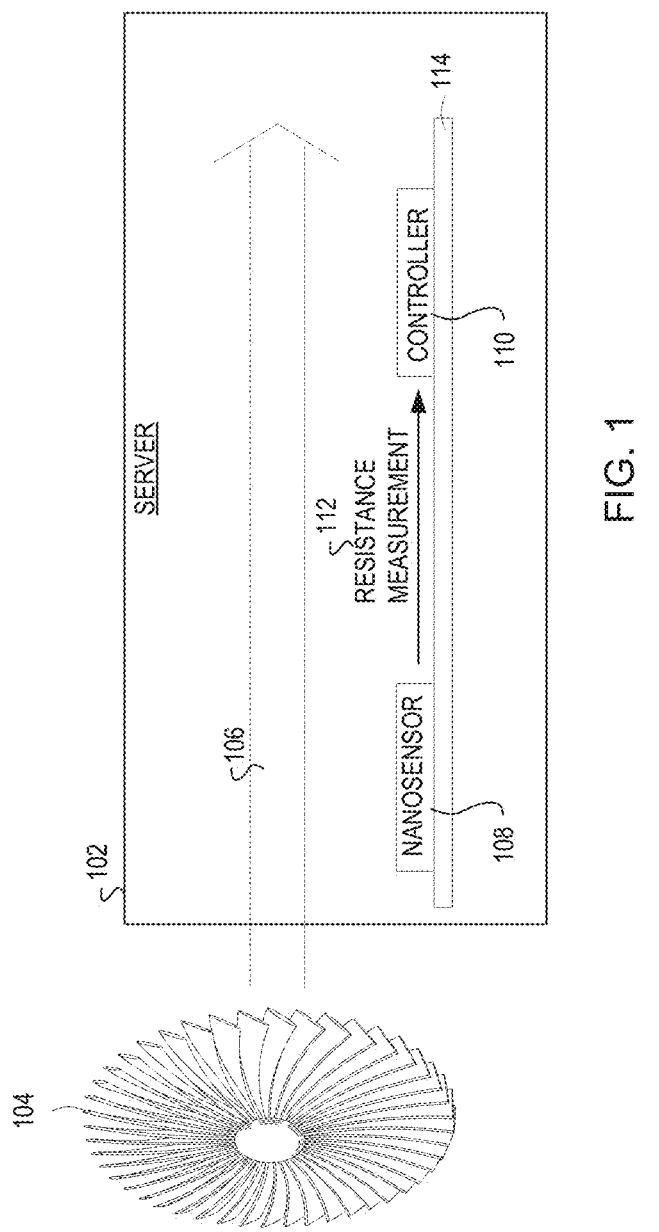

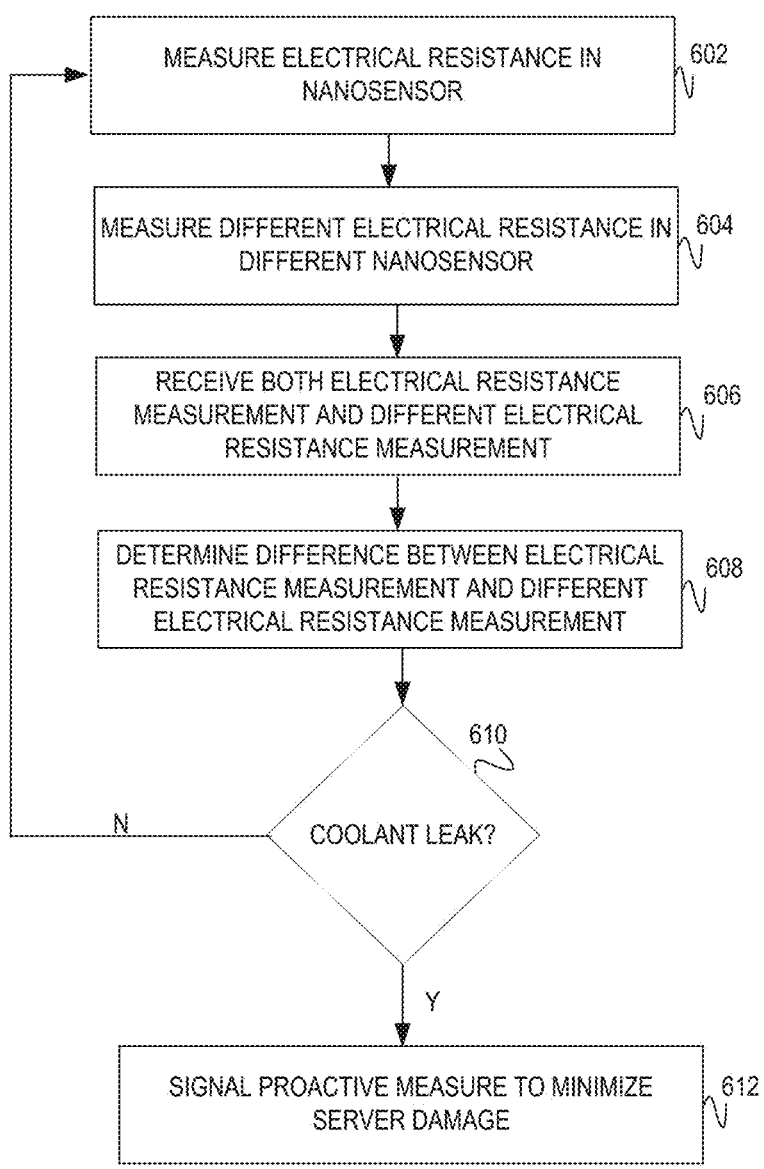

US 10,337,950 B2

COOLANT LEAK DETECTION BASED ON A NANOSENSOR RESISTANCE MEASUREMENT

BACKGROUND

As global demand for data exchange has grown, so does a size and load placed on a server. As such, servers generate exponentially more power thus producing more heat. Liquid cooling may be used to keep the server and/or computing components within permissible operating temperature limits. Keeping components within the permissible operating temperature limits prevents degradation and downtime of the components and/or server system.

BRIEF DESCRIPTION OF THE DRAWINGS

In the accompanying drawings, like numerals refer to like components or blocks. The following detailed description references the drawings, wherein:

FIG. 1 illustrates an example system including a nanosensor coupled to an airflow channel on a server mother board in accordance with the present disclosure;

FIG. 6 illustrates an example flow diagram for measuring multiple electrical resistances in a nanosensor array and providing the multiple electrical resistance measurements for identifying a presence of a coolant leak in accordance with the present disclosure.

DETAILED DESCRIPTION

Figure 2B:
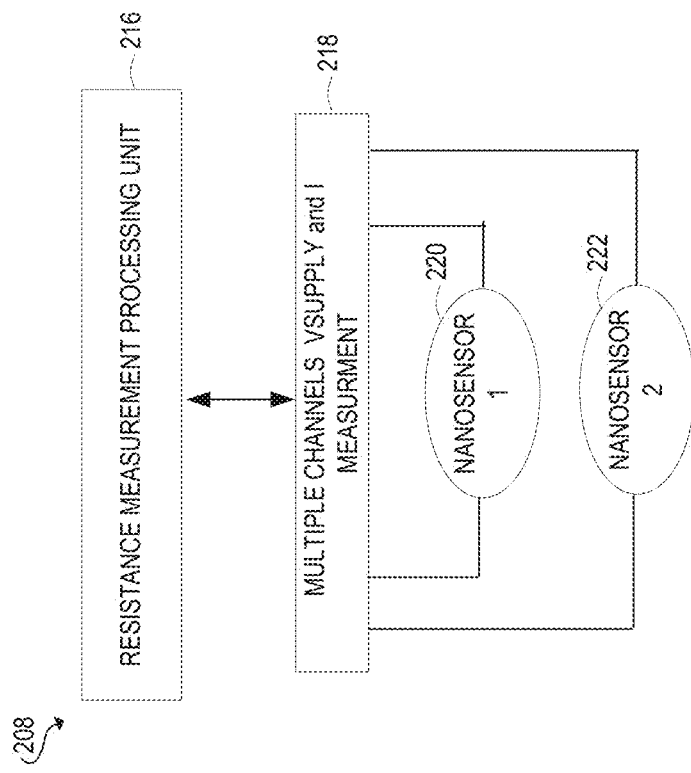
FIG. 2B illustrates an example nanosensor system including a first nanosensor and a second nanosensor to provide resistance measurements to a controller in accordance with the present disclosure.

Liquid cooling removes waste heat produced by server components by directing the flow of a cooling liquid in proximity to the heated components. The cooling liquid removes the waste heat from the server components and routes it away from the server. The cooling liquid as discussed herein may also be referred to as coolant. As such, coolant may include, by way of example, water, nitrogen, propylene glycol, mineral oil, refrigerant, dielectric, or some combination thereof. A cooling member, such as a duct, may carry the coolant throughout the server; however, one challenge is detecting when the cooling member may lose or admit coolant, thus causing a coolant leak. For example, it may be difficult to detect when moisture is present in the server system as caused by the leak or other elements. To minimize damage, various approaches to leak detection are to detect at the server-level, chassis-level, rack-level, and/or row-level. One of these approaches detects liquid leaks through use of a rope sensor. However, rope sensors may be bulky, costly and finicky. Also, rope sensors are physically difficult to route along a motherboard in a server and cost prohibitive to include throughout a system. For example, a rope sensor may be used to detect leaks in a server system; however the size of the sensors makes it difficult to effectively cover a motherboard. Additionally, the rope sensors may provide false positive signals even in the absence of a leak. Further, once moisture has contacted the rope sensors, the sensors take a significant period of time to fully dry prior to use. Therefore, rope sensors and other such options may not provide adequate protection without time delay and damage risk to the server.

To address these issues, examples disclose a system to effectively detect a cooling member leak. The system includes a nanosensor coupled to an airflow channel in a server to provide a resistance measurement. The nanosensor is considered part of the nanotechnology area that provides nanocomponents in the range of dimensions from one to several hundred nanometers. Using nanosensors on a motherboard to detect the coolant leak decreases the amount of space these components require, thus making more effective use of the space on the motherboard. Additionally, nanosensors are non-intrusive and effective at detecting the coolant leak.

In addition, other examples disclose how the resistance measurement may vary based on the nanosensor material. Different nanosensor material allows a designer to improve the reliability and sensitivity of the nanosensors to minimize false positive and false negative responses.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for detecting a coolant leak via a resistance measurement. The disclosed examples may include systems, devices, computer-readable storage media, and methods for detecting the coolant leak. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

FIG. 1 illustrates an example nanosensor system including nanosensor 108 to provide resistance measurement 112 to controller 110. Nanosensor 108 and controller 110 may reside on circuit board 114 within server 102. Further, nanosensor 108 is coupled to airflow channel 106. Airflow channel 106 provides cooling air from fan 104 from an ingress of server 102 to egress. Alternatively, airflow channel 106 may flow from front of server 102 to the back of server 102. Nanosensor 108 provides resistance measurement 112 to controller 110 to detect a presence of a coolant leak.

The system in FIG. 1 represents a server system in a data center for data exchange, computation, storage, etc. Although FIG. 1 illustrates server 102 including components 108, 110, and 114, implementations should not be limited as this was done for illustration purposes. For example, server 102 may further include additional components not illustrated, such as a cooling member (not illustrated) to carry coolant (e.g., cooling liquid) through server 102 to electrical components. The cooling member is a duct that may carry the coolant, such as water throughout server 102. Upon delivering the coolant, the cooling member works to draw away heat from the components. The cooling member may lose or admit coolant thus causing the coolant leakage. In implementations, the cooling member may be positioned adjacent to airflow 106, in other implementations, the cooling member may be located within airflow 106 of server 102. As such, implementations of server 102 may include, a database server, mail server, file server, domain name system (DNS) server, print server, web server, game server, application server, telecommunications server, cartridge server, blade server, catalog server, communication server, home server, media server, proxy server, or other type of computing device capable of data exchange.

Airflow channel 106 is a path of airflow within server 102 as caused by fan 104. Airflow channel 106 is initiated by fan 104 to the ingress of server 102 and exits server 102 at the egress. Nanosensor 108 is coupled to airflow channel 106 such that upon the cooling member leaking coolant, fan 104 may push the coolant through airflow channel 106. Upon the coolant leakage, nanosensor 108 measures the coolant by taking the resistance measurement 112. This may be discussed later in FIG. 1.

Nanosensor 108 is a sensor that provides resistance measurement 112 to controller 110. Circuit board 114 provides power to nanosensor 108 for resistance measurement 112. Nanosensor 108 as an application of nanotechnology, collects and transmits information (resistance measurement 112) about data on the nanoscale, measured in nano-ohms. Nanotechnology may include a range of dimensions from 1 to several hundred nanometers. Nanosensor 108 may be a chemical sensor, mechanical sensor, and/or electrical sensor. Nanosensor 108 operates by monitoring electrical changes, namely resistance, in the sensor materials. For example, air (e.g., absence of coolant leak) may provide a baseline resistance measurement. Thus, when the coolant leaks, more moisture (e.g., liquid) may be present in sensor materials. As such, nanosensor 108 resistance measurement 112 will change based on the presence of the cooling liquid. In one implementation, nanosensor 108 includes a gap field across two conductors. In this implementation, nanosensor 108 measures the electrical resistance across the gap field. In this implementation, the resistance across the gap field may vary based on the dielectric of the gap field. For example, the air gap field may provide a different resistance measurement from a moisture saturated gap field. Resistance measurement 112 is a value provided to controller 110 to identify the coolant leak.

Controller 110 receives resistance measurement 112 from nanosensor 108 to identify a presence of the coolant leak. Controller 110, as coupled to circuit board 114, is a discrete device or physical entity in the server which is used to affect electrons or their associated fields. Specifically, controller 110 manages the functioning and operation of server 102. Based on receiving resistance measurement 112 from nanosensor 108, controller 110 identifies the presence of the coolant leak from the cooling member. In one implementation, controller 110 if resistance measurement 112 is above or below a particular threshold, thus indicating the coolant leak. In another implementation, controller 110 receives multiple resistance measurements over time from nanosensor 108. A change in resistance measurement 112 in the value may also indicate a coolant leak. In yet another implementation, controller 110 receives resistance measurements from nanosensors located at the ingress and egress of server 102. A change in the resistance measurements from the ingress nanosensor and the egress nanosensor would also detect the coolant leak. Controller 110 may include, by way of example, an integrated circuit, semiconductor, memory module, central processing unit (CPU), processing resource, application-specific integrated circuit (ASIC), controller, processor, chipset, or other type of hardware component.

Circuit board 114 connects the various internal components of server 102. In a specific implementation, circuit board 114 includes the motherboard or mainboard of server 102 to connect the internal components. Circuit board 114 is a printed circuit board which mechanically supports and electrically connects electrical components, such as nanosensor 108 and controller 110, using conductive tracks, pads, or other features. The electrical connections on circuit board 114 are created through an etching of a copper sheet which is laminated onto a non-conductive substrate. Circuit board 114 may include, by way of example, a system board, baseboard, planar board, logic board, substrate, etc.

Figure 2A:
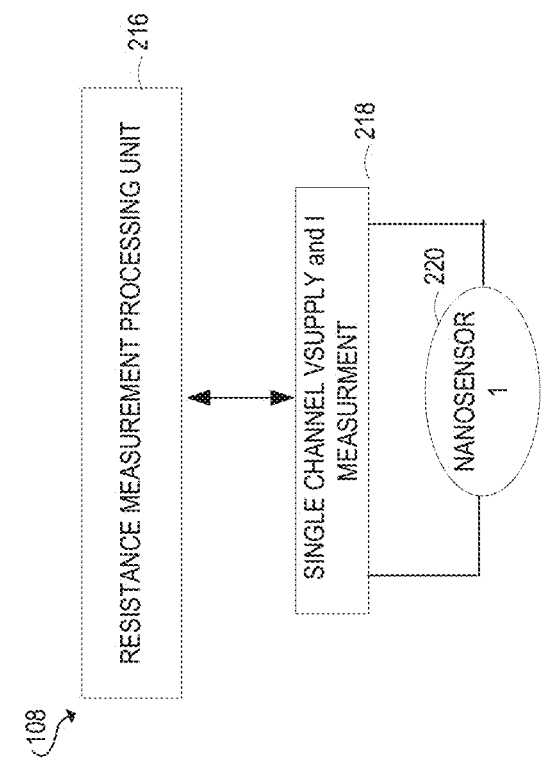
FIG. 2A illustrates an example nanosensor system including a nanosensor to provide a resistance measurement to a controller in accordance with the present disclosure.

FIGS. 2A-2B illustrate an example nanosensor system 108 and an example nanosensor array system 208. Each system 108 and 208 is located on a circuit board (not illustrated) such as 114 in FIG. 1. In FIG. 2A, nanosensor system 108 represents the connections between a single nanosensor 220 and the various components 216 and 218 to provide the resistance measurement to the controller (not illustrated). It may be assumed for clarifications purposes, component 216 is coupled to the controller to provide the resistance measurements. Component 218 represents the channel taken to provide power to nanosensor 220 to measure the current (I measurement) and transmit to component 218. Component 218 receives the current measurement and uses the known applied voltage (V supply) to obtain the resistance measurement and transmit to the controller.

In FIG. 2B, nanosensor array system 208 unlike nanosensor system 108, includes multiple nanosensors 220 and 218. As such, there may be multiple channels to provide power to each nanosensor 218 and 220 to obtain a current measurement as at component 218. Component 208 may represent the various channels flowing to each nanosensor 220 and 222 to provide power. Providing power via (Vsupply) from the circuit board to each nanosensor 220 and 222, power is applied to the nanosensor materials that allows for a current measurement at component 218. Taking both the known voltage and current measurement, resistance measurement component 216 may measure the resistance at each nanosensor 220 and 222. Although components 216 and 218 may be illustrated as separate components, these components 216 and 218 may also be combined to provide the resistance measurement to the controller (not illustrated). Implementations of components 216 and 218 may include, by way of example, an integrated circuit, semiconductor, memory module, central processing unit (CPU), processing resource, application-specific integrated circuit (ASIC), controller, processor, chipset, or other type of component.

Figure 3:
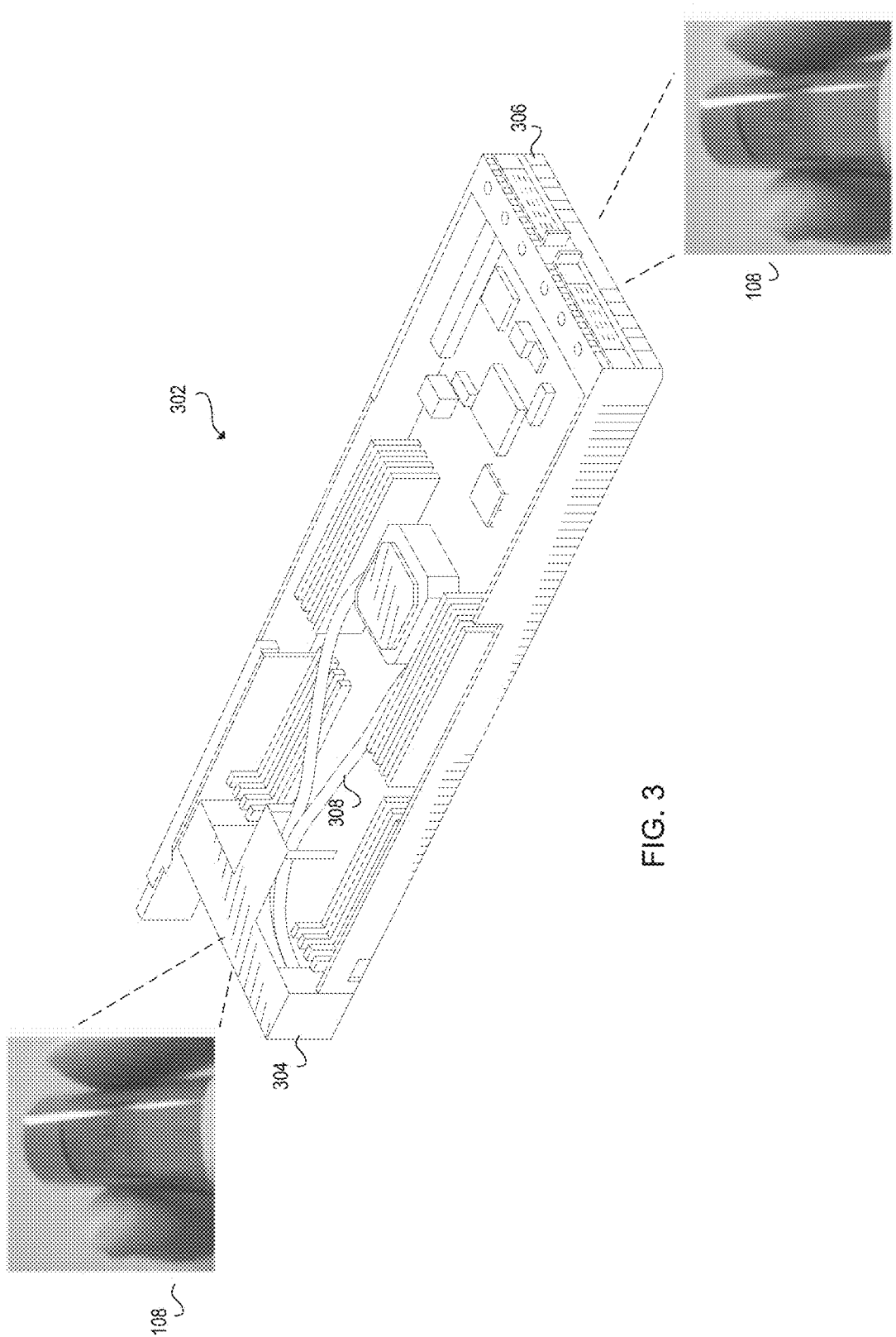
FIG. 3 illustrates an example server including a nanosensor located in an ingress and/or egress of a server airflow to detect a coolant leak in accordance with the present disclosure.

FIG. 3 illustrates an example server 302 including nanosensor 108 located at both an ingress 304 and egress 306 of server 302 airflow to detect a coolant leak. Server 302 includes cooling member 308 which carries coolant throughout to cool the various components. Although FIG. 3 illustrates cooling member 308 in a loop, implementations should not be limited as cooling member 308 may be placed in a straight path as opposed to the loop. Nanosensors 108 are located at both ingress 304 and egress 306 of the airflow within server 302. Thus, nanosensors 108 may detect when cooling member 308 is leaking coolant via resistance measurements to controller (not illustrated). The ingress nanosensor may also be referred to as a first nanosensor while the egress nanosensor may be referred to as a second nanosensor. Changes between the resistance measurements provided to the controller indicates the coolant leak from cooling member 308. Nanosensors 108 may also include nanosensor arrays as illustrated in connection with FIG. 2B.

Figure 4:
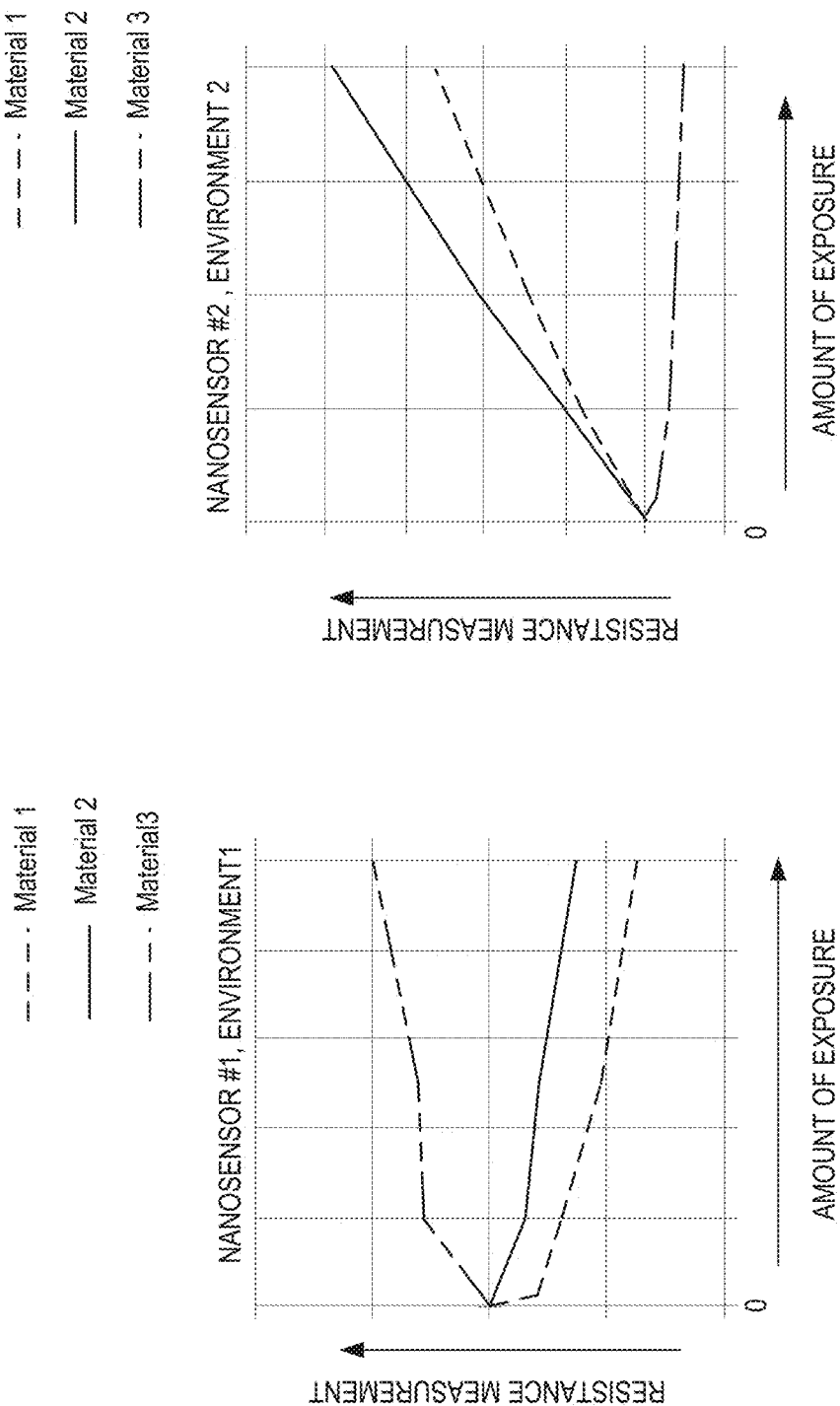
FIGS. 4A-4B illustrate example graphs representing a variation of electrical resistance measurements based on a type of material comprising a nanosensor in accordance with the present disclosure.

FIGS. 4A-4B illustrate an example graph representing various electrical resistance measurements in accordance with the present disclosure. The graphs represent how different sensor materials comprising a nanosensor array can change the electrical resistance measurements. FIGS. 4A-4B show the sensitivity of the nanosensor depending on the exposure to a type of specific environmental factor, such as a specific gas or specific coolant (Environment 1 and Environment 2). The measured resistance changes given the type of sensor material type (Material 1, Material 2, Material 3). The amount of exposure to the specific environmental factor is represented on the x-axis while the resistance measurements are represented on the y-axis. As indicated with the arrows, the resistance measure increases from bottom to top, while the amount of exposure to the environmental factor is increased from left to right. Different nanosensor materials may provide different sensitivities and resistance measurements. Thus, the material of the nanosensor is one of the considerations when designing the nanosensor system for detecting a particular coolant leak.

FIG. 4A, on the left graph, illustrates the nanosensor (nanosensor #1) material sensitivity upon exposure to a specific environmental factor, such as a specific gas or specific coolant. A different nanosensor material is illustrated with a different line pattern as represented in the legend above the graph. In this graph, the nanosensor may comprise a different material including material 1, material 2, and material 3. Each different material shows a different resistance measurement when exposed to the specific environmental factor. For example, assume the nanosensor comprises the third type of material (material 3), the resistance measurements increase with a greater increase in the specific environmental factor. Thus, this indicates the type of material used to comprise the nanosensor may produce different resistance measurements.

FIG. 4B, on the right graph, illustrates the nanosensor (nanosensor #2) material sensitivity up on exposure to a different environmental factor (Environment 2). The various nanosensor materials are each illustrated with different line pattern as in the legend about the figure. In this graph, the nanosensor may comprise a different material including material 1, material 2, and material 3. Each different material may correspond to a different resistance measurement as seen on the y-axis depending on the amount of exposure to the specific environmental factor.

Figure 5:
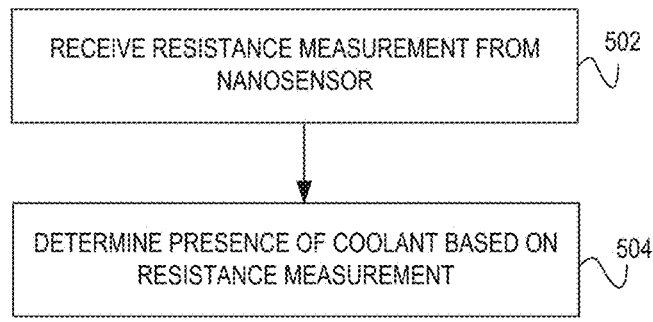
FIG. 5 illustrates an example flow diagram for receiving a resistance measurement from a nanosensor and in response, determining a presence of a coolant leak in accordance with the present disclosure.

Referring now to FIGS. 5 and 6, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 5-6 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 5 is a flow diagram illustrating a method of determining a presence of a coolant leak in a server and/or data center based on a received resistance measurement from a nanosensor. The method may be initiated to measure an electrical resistance in the nanosensor. The electrical resistance measurement may be provided to a controller. In turn, the controller may determine the presence of the coolant leak. The various operations, processing blocks, and/or data flows depicted in FIG. 5 is described in greater detail herein. The described processing blocks may be accomplished using some or all of the system components described in detail above. For example in discussing FIG. 5, references may be made to the components in FIGS. 1-3 to provide contextual examples. In one implementation, controller 104 as in FIG. 1 executes operations 502-504 to determine the presence of the coolant leak based on the received electrical resistance measurement. Although FIG. 5 is described as implemented by controller 104, it may be executable on other suitable hardware components. Accordingly, the method of FIG. 5 as illustrated (and described in greater detail below) is meant be an example and, as such, should not be viewed as limiting. For example, the method of FIG. 5 may be implemented in the form of executable instructions stored on a machine-readable storage medium and/or in the form of electronic circuitry.

At operation 502, the nanosensor provides the resistivity measurement to the controller. The resistivity measurement measures how strong a given material may oppose a flow of electrical current. As such, the nanosensor may include a gap field between two nanostructures, such as conductors and/or wires to measure the resistivity. A baseline measurement may be initially measured by the nanosensor that between the gap field. The baseline measurement provides a calibration measurement such that a change in the baseline measurement may indicate the presence of another material, thus indicating the coolant leak. In another implementation, the resistance measurement may be considered a threshold value. For example, assume the gap field is composed of air. As such, the electrical resistance measurement may fall as a higher resistance value since air may be considered more of an insulator. Upon the coolant leak, the gap field may be condensed with moisture, thus the resistance measurement may be a lower value, as the moisture with presence of ions and minerals may be much more conductive. The electrical resistance may also be measured on each conductor across the gap field to obtain an overall electrical resistance measurement at a point in time within the nanosensor. In a further implementation, the nanosensor may be placed at an ingress and egress of an airflow channel in the server. In this implementation, a cooling duct that may circulate coolant within the server. Thus, the controller may receive a first resistance measurement corresponding to the ingress nanosensor measurement and a second resistance measurement corresponding to the egress nanosensor. In yet a further implementation a circuit board, as coupled to the nanosensor, may provide the power to the nanosensor. The provision of power to the nanosensor enables the nanosensor to measure the resistivity to provide to the controller.

At operation 504, the controller receives the resistance measurement generated at operation 502 and detects the presence of the coolant leak. The presence of the coolant leak may indicate an increase of moisture within the server, thus signaling the presence of the coolant leak. In one implementation, the controller detects the resistance measurement changes from the nanosensor over time to detect the liquid coolant leak. In another implementation, the value of the resistance measurement may indicate the coolant leak. For example, if the value of the resistance measurement is above or below the threshold, this may also signal the coolant leak.

FIG. 6 illustrates an example flow diagram for measuring multiple electrical resistances in a nanosensor array. The nanosensor array includes a first nanosensor located at an ingress of a server and a second nanosensor located at an egress of the server. The first and the second nanosensor each provide an electrical resistance measurement to a controller. The controller in turns uses both resistance measurements to detect the coolant leak. In response to the presence of the coolant leak, the controller may signal a proactive approach, such as reducing the power to the server or transmitting a notification of the coolant leak. The various operations, processing blocks, and/or data flows depicted in FIG. 6 is described in greater detail herein. The described processing blocks may be accomplished using some or all of the system components described in detail above. For example in discussing FIG. 6, references may be made to the components in FIGS. 1-3 to provide contextual examples. In one implementation, controller 110 as in FIG. 1 executes operations 602-612 to determine the presence of the coolant leak based on the received resistance measurements from both the first nanosensor and the second nanosensor. In another implementation, the nanosensor array system as seen in FIGS. 1-3 executes operations 602-612. Although FIG. 6 is described as implemented by controller 110, it may be executable on other suitable hardware components. Accordingly, the method of FIG. 6 as illustrated (and described in greater detail below) is meant be an example and, as such, should not be viewed as limiting. For example, the method of FIG. 6 may be implemented in the form of executable instructions stored on a machine-readable storage medium and/or in the form of electronic circuitry.

At operation 602, the nanosensor measures the electrical resistance. In one implementation, this may include measuring the electrical resistance across a gap field between two nanostructures, such as a conductor or wire within the nanosensor. Alternatively, the measurement may be obtained from an individual conductor and/or wire. In an implementation, the nanosensor at this operation is considered a first nanosensor at the ingress of the server to obtain the first electrical resistance measurement. The first nanosensor may work in combination with a second nanosensor located at the egress of the airflow channel in the server and the controller. In another implementation, the nanosensor at this operation is located at the ingress of an airflow channel in the server. Measuring the electrical resistance at the ingress allows the controller to detect the presence of a coolant leak in another adjacent server. Detecting the coolant leak in the adjacent server, assumes the airflow between the server in which the nanosensor is placed and the adjacent server are located adjacently, such as in a rack position. Upon obtaining the electrical resistance measurement, the nanosensor may relay this measurement to the controller.

At operation 604, a different nanosensor measures the electrical resistance at the egress of the airflow channel. As explained in connection with operation 602 the different nanosensor, also referred to as the second nanosensor, is located at the egress of the airflow channel in the server. As such, the first nanosensor and the second nanosensor provide resistance measurements to the controller. Each nanosensor is coupled to the airflow channel, thus allowing the resistance measurements that would detect the coolant leak.

At operation 606, the controller receives both electrical resistance measurements from the nanosensor and the different nanosensor. Alternatively, the control receives the first electrical resistance measurement from the first nanosensor at the ingress of the airflow channel and the second resistance measurement from the second nanosensor at the egress of the airflow channel. In turn, the controller may proceed to identify the presence of the coolant leak as at operation 610. Operation 606 may be similar in functionality to operation 502 as in FIG. 5.

At operation 608, upon the controller receiving the electrical resistance measurements from the various nanosensors, the controller uses the measurements to identify a difference. The identified difference may include a value between the electrical resistance measurements to identify the presence of the coolant leak. Alternatively, the difference may be used to identify a change between the ingress nanosensor resistance measurement and the egress nanosensor resistance measurement. This change indicate the presence of the coolant leak.

At operation 610 in response to the resistance measurement, the controller determines the presence of the coolant leak. In one implementation, identifying the presence of the coolant leak may indicate the server should take a proactive measure to avoid damage. One example of one of these proactive measures may include reducing the power to the server as at operation 612. In another implementation, if the controller determines an absence of the coolant leak, the controller may continue to receive resistance measurements from the various nanosensors in the server system as at operations 602-606. Operation 610 may be similar in functionality to operation 504 as in FIG. 5.

At operation 612 in response to the positive determination that the coolant leak is present within the server, the controller may perform a proactive measure or approach to minimize server damage. Such examples may include transmit alert, notification, and/or decrease power to the server.

Operation 612 represents a proactive measure the controller may take based on the presence of the coolant leak to prevent further damage.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A system to detect a coolant leak, the system comprising:
a first nanosensor, coupled to an airflow channel in a server, to provide a first resistance measurement to a controller;
a second nanosensor, coupled to the airflow channel downstream of the first nanosensor, to provide a second resistance measurement to the controller; and
the controller, coupled to the first and second nanosensors, to detect a coolant leak within the server based on the first and second resistance measurements.

2. The system of claim 1,
wherein the controller is to detect the coolant leak within the server based on a difference between the first and second resistance measurements.

3. The system of claim 2,
wherein the controller is to detect the coolant leak within the server in response to the difference being greater than a threshold value.

4. The system of claim 1 wherein the first nanosensor and the second nanosensor are located on different substrates.

5. The system of claim 1 wherein the first resistance measurement varies depending on a type of material comprising the first nanosensor.

6. The system of claim 1 wherein to provide the first resistance measurement to the controller the first nanosensor is to:
measure a differential voltage between two nanostructures to obtain the first resistance measurement.

7. The system of claim 1 wherein the system to detect the coolant leak within the server is provided at a server-level.

8. The system of claim 1 wherein the first nanosensor is coupled to an ingress of the airflow channel in the server.

9. The system of claim 1 wherein the second nanosensor is coupled to an egress of the airflow channel in the server.

10. A nanosensor array comprising:
a first nanosensor, coupled to an ingress of an airflow channel in a server, to provide a first resistance measurement to an integrated circuit;
a second nanosensor, coupled to an egress of the airflow channel in the server, to provide a second resistance measurement to the integrated circuit; and
the integrated circuit, coupled to the first nanosensor and the second nanosensor, to detect a coolant leak in the server based on the first resistance measurement and the second resistance measurement.

11. The nanosensor array of claim 10 wherein the first nanosensor and the second nanosensor each comprises a different material.

12. The nanosensor array of claim 10 wherein to provide the first resistance measurement to the integrated circuit, the first nanosensor is to measure an electrical resistivity between two nanostructures.

13. The nanosensor array of claim 10 wherein to detect the coolant leak in the server based on the first resistance measurement and the second resistance measurement, the integrated circuit is to:
determine a difference between the first resistance measurement and the second resistance measurement;
in response to the difference being greater than a threshold value, determine a presence of the coolant leak in the server.

14. The nanosensor array of claim 10 wherein the first nanosensor and the second nanosensor are substantially parallel to one another and each are coupled to the integrated circuit.

15. The nanosensor array of claim 10 wherein the first nanosensor and the second nanosensor each include a gap field to provide the resistance measurements.

16. The nanosensor array of claim 10 wherein the first nanosensor and the second nanosensor are each located on a different substrate.

17. A method to determine a presence of a coolant leak in a server, the method comprising:
receiving a first resistance measurement from a first nanosensor coupled to an airflow channel in the server;
receiving a second resistance measurement from a second nanosensor coupled to the airflow channel downstream of the first nanosensor; and
determining the presence of the coolant leak in the server based on the first and second resistance measurements.

18. The method of claim 17 wherein receiving the first resistance measurement from the first nanosensor comprises:
measuring an electrical resistance between two nanostructures in the first nanosensor.

19. The method of claim 17 comprising:
in response to the determination of the presence of the coolant leak, decreasing power to the server.

20. The method of claim 17
wherein the second nanosensor is coupled to an egress of the airflow channel in the server.

21. The method of claim 20 wherein determining the presence of the coolant leak in the server based on the first and second resistance measurements comprises:
determining a difference between the first resistance measurement and the second resistant measurement; and
based on the determined difference, identifying the presence of the coolant leak.

* * * * *